United States Patent
Derbeko et al.

(10) Patent No.: US 9,201,803 B1
(45) Date of Patent: Dec. 1, 2015

(54) SYSTEM AND METHOD FOR CACHING DATA

(71) Applicant: EMC Corporation, Hopkinton, MA (US)

(72) Inventors: Philip Derbeko, Modiin (IL); Anat Eyal, Tel Aviv (IL); Zvi Gabriel Benhanokh, Tel Aviv (IL); Arieh Don, Newton, MA (US); Orly Devor, Zichron Yaakov (IL)

(73) Assignee: EMC Corporation, Hopkinton, MA (US)

( * ) Notice: Subject to any disclaimer, the term of this patent is extended or adjusted under 35 U.S.C. 154(b) by 251 days.

(21) Appl. No.: 13/731,456

(22) Filed: Dec. 31, 2012

(51) Int. Cl.
*G06F 12/00* (2006.01)
*G06F 12/08* (2006.01)
*G06F 12/12* (2006.01)
*G06F 12/02* (2006.01)

(52) U.S. Cl.
CPC ........ *G06F 12/0891* (2013.01); *G06F 12/0246* (2013.01); *G06F 12/0866* (2013.01); *G06F 12/121* (2013.01); *G06F 12/122* (2013.01); *G06F 12/123* (2013.01)

(58) Field of Classification Search
CPC  G06F 12/121; G06F 12/0866; G06F 12/0804
See application file for complete search history.

(56) References Cited

U.S. PATENT DOCUMENTS

| | | | |
|---|---|---|---|
| 6,742,084 B1 * | 5/2004 | Defouw et al. | 711/136 |
| 2012/0311269 A1 * | 12/2012 | Loh et al. | 711/133 |
| 2014/0115225 A1 * | 4/2014 | Chandrakar et al. | 711/3 |

* cited by examiner

Primary Examiner — Cheng-Yuan Tseng
Assistant Examiner — Arvind Talukdar
(74) Attorney, Agent, or Firm — Brian J. Colandreo; Mark H. Whittenberger; Holland & Knight LLP

(57) ABSTRACT

A method, computer program product, and computing system for storing a plurality of frontend data chunks within a cache system. The plurality of frontend data chunks correspond to a plurality of backend data chunks stored within a data array. A device weight is determined for each of the plurality of backend data chunks. The device weight is indicative of the type of storage device upon which each of the plurality of backend data chunks is stored within the data array. A deletion score is assigned to each of the plurality of frontend data chunks. Each deletion score is based, at least in part, upon the device weight determined for its corresponding backend data chunk.

15 Claims, 3 Drawing Sheets

SYSTEM AND METHOD FOR CACHING DATA

TECHNICAL FIELD

This disclosure relates to storage devices and, more particularly, to multi-tier storage devices.

BACKGROUND

Storing and safeguarding electronic content is of paramount importance in modern business. Accordingly, various systems may be employed to protect such electronic content. Data storage system are often compartmentalized into different tiers having different levels of performance, wherein data that is accessed less often is placed into a slower performance tier, while data that is accessed more often is placed into a higher performance tier.

SUMMARY OF DISCLOSURE

In one implementation, a computer-implemented method includes storing a plurality of frontend data chunks within a cache system. The plurality of frontend data chunks correspond to a plurality of backend data chunks stored within a data array. A device weight is determined for each of the plurality of backend data chunks. The device weight is indicative of the type of storage device upon which each of the plurality of backend data chunks is stored within the data array. A deletion score is assigned to each of the plurality of frontend data chunks. Each deletion score is based, at least in part, upon the device weight determined for its corresponding backend data chunk.

One or more of the following features may be included. One or more of the plurality of frontend data chunks may be deleted based, at least in part, upon its deletion score. A duration weight may be determined for each of the plurality of frontend data chunks. The duration weight may be indicative of the amount of time since each of the plurality of frontend data chunks has been accessed within the cache system. Each deletion score may be further based, at least in part, upon the duration weight determined for each of the plurality of frontend data chunks. The cache system may be a frontend cache system included within a host. The storage device type may classify storage devices based upon performance levels. The storage device type may include one or more of a SATA storage device type, a fiber channel storage device type, and a flash storage device type.

In another implementation, a computer program product residing on a computer readable medium having a plurality of instructions stored thereon which, when executed by a processor, cause the processor to perform operations including storing a plurality of frontend data chunks within a cache system. The plurality of frontend data chunks correspond to a plurality of backend data chunks stored within a data array. A device weight is determined for each of the plurality of backend data chunks. The device weight is indicative of the type of storage device upon which each of the plurality of backend data chunks is stored within the data array. A deletion score is assigned to each of the plurality of frontend data chunks. Each deletion score is based, at least in part, upon the device weight determined for its corresponding backend data chunk.

One or more of the following features may be included. One or more of the plurality of frontend data chunks may be deleted based, at least in part, upon its deletion score. A duration weight may be determined for each of the plurality of frontend data chunks. The duration weight may be indicative of the amount of time since each of the plurality of frontend data chunks has been accessed within the cache system. Each deletion score may be further based, at least in part, upon the duration weight determined for each of the plurality of frontend data chunks. The cache system may be a frontend cache system included within a host. The storage device type may classify storage devices based upon performance levels. The storage device type may include one or more of a SATA storage device type, a fiber channel storage device type, and a flash storage device type.

In another implementation, a computing system including at least one processor and at least one memory architecture coupled with the at least one processor, wherein the computing system is configured to perform operations including storing a plurality of frontend data chunks within a cache system. The plurality of frontend data chunks correspond to a plurality of backend data chunks stored within a data array. A device weight is determined for each of the plurality of backend data chunks. The device weight is indicative of the type of storage device upon which each of the plurality of backend data chunks is stored within the data array. A deletion score is assigned to each of the plurality of frontend data chunks. Each deletion score is based, at least in part, upon the device weight determined for its corresponding backend data chunk.

One or more of the following features may be included. One or more of the plurality of frontend data chunks may be deleted based, at least in part, upon its deletion score. A duration weight may be determined for each of the plurality of frontend data chunks. The duration weight may be indicative of the amount of time since each of the plurality of frontend data chunks has been accessed within the cache system. Each deletion score may be further based, at least in part, upon the duration weight determined for each of the plurality of frontend data chunks. The cache system may be a frontend cache system included within a host. The storage device type may classify storage devices based upon performance levels. The storage device type may include one or more of a SATA storage device type, a fiber channel storage device type, and a flash storage device type.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
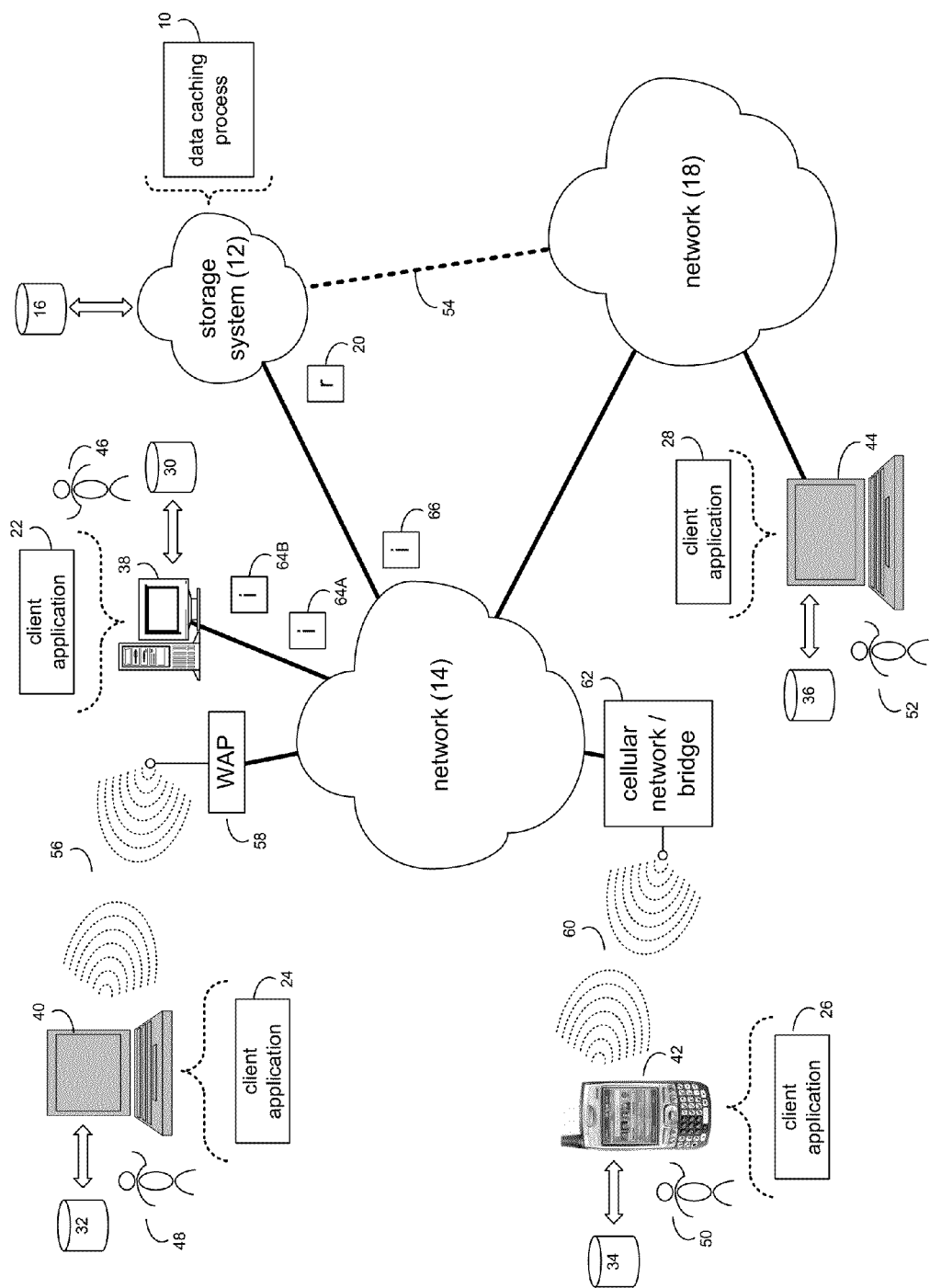
FIG. 1 is a diagrammatic view of a storage system and a data caching process coupled to a distributed computing network.

Referring to FIG. 1, there is shown data caching process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of data caching process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage system 12. Examples of data request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Client electronic devices 38, 40, 42, 44 may each execute an operating system, examples of which may include but are not limited to Microsoft Windows™, Microsoft Windows CE™, Redhat Linux™, or a custom operating system.

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of rotating, electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
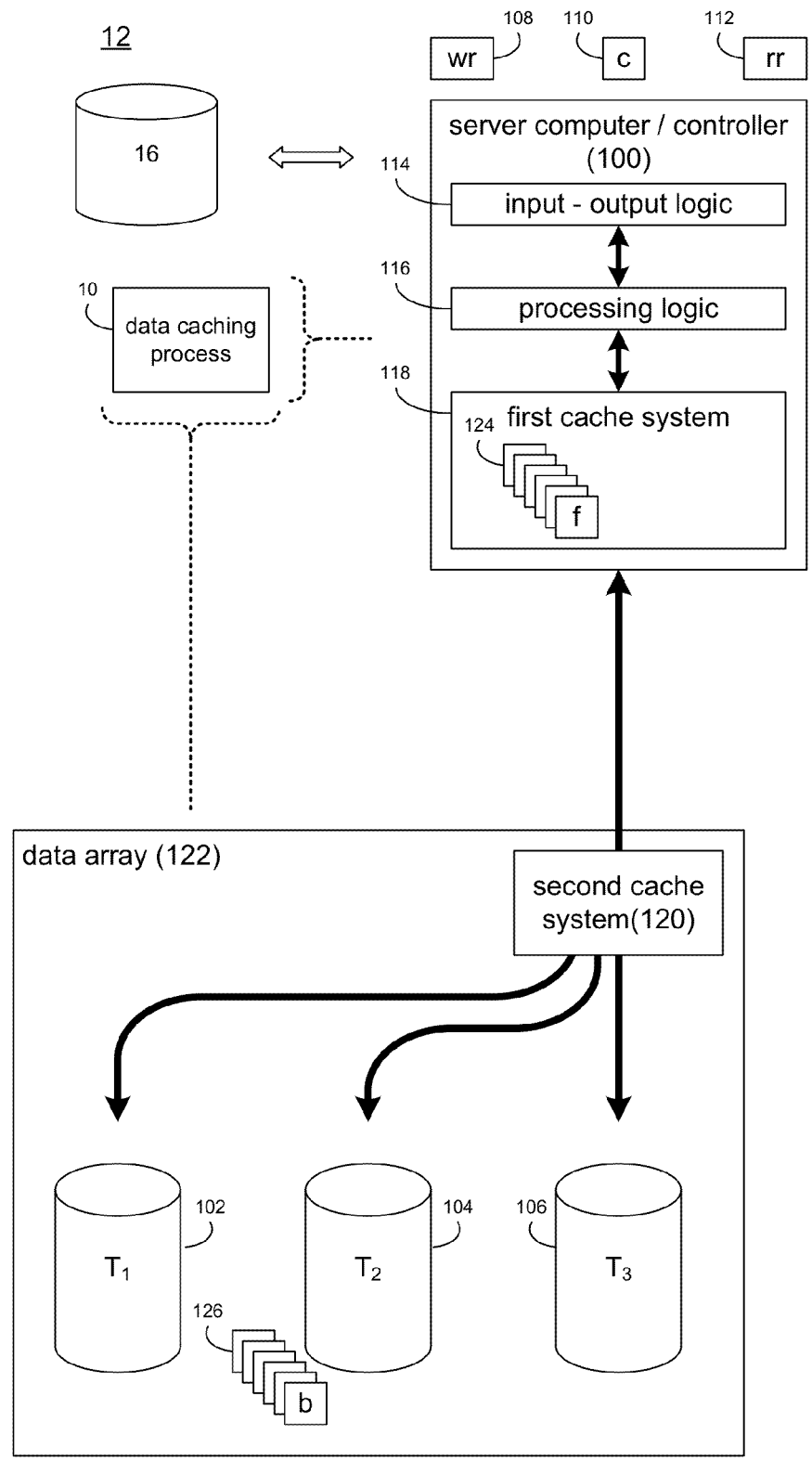
FIG. 2 is a diagrammatic view of the storage system of FIG. 1.

Referring also to FIG. 2, storage system 12 may include a server computer/controller (e.g. server computer/controller 100), and a plurality of data tiers T 1-n (e.g. data tiers 102, 104, 106). Data tiers 102, 104, 106 may be configured to provide various levels of performance. For example. one or more of data tiers 102, 104, 106 may be configured to be a lower performance data tier and one or more of data tiers 102, 104, 106 may be configured to be a higher performance data tier.

For example, data tier 102 may be configured as a higher performance data tier and may include one or more flash storage devices. Data tier 104 may be configured as a medium performance data tier and may include one or more fiber channel storage devices. And data tier 106 may be configured as a lower performance data tier and may include one or more lower performance storage devices (e.g., SATA drives, SCSI drives, SAS drives, IDE drives, and EIDE drives).

One or more of data tiers 102, 104, 106 may be configured to provide various levels of performance and/or high availability. For example, one or more of data tiers 102, 104, 106 may be configured as a RAID 0 array, in which data is striped across multiple drives. By striping data across multiple drives, improved performance may be realized. However, RAID 0 arrays do not provide a level of high availability. Accordingly, one or more of data tiers 102, 104, 106 may be configured as a RAID 1 array, in which data is mirrored between multiple drives. By mirroring data between multiple drives, a level of high availability is achieved as multiple copies of the data are stored within storage system 12.

While data tiers 102, 104, 106 are discussed above as possibly being configured in a RAID 0 or RAID 1 array, this is for illustrative purposes only and is not intended to be a limitation of this disclosure, as other configurations are possible. For example, data tiers 102, 104, 106 may be configured in a non-RAID fashion or as a RAID 3, RAID 4, RAID 5 or RAID 6 array.

While in this particular example, storage system 12 is shown to include three data tiers (e.g. data tiers 102, 104, 106), this is for illustrative purposes only and is not intended to be a limitation of this disclosure. Specifically, the actual number of data tiers may be increased or decreased depending upon system needs.

As discussed above, data tiers 102, 104, 106 may include one or more one or more flash storage devices, fiber channel storage devices, and lower performance storage devices (e.g., SATA drives, SCSI drives, SAS drives, IDE drives, and EIDE drives).

Storage system 12 may execute all or a portion of data caching process 10. The instruction sets and subroutines of data caching process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various data requests (e.g. data request 20) may be generated. For example, these data requests may be sent from client applications 22, 24, 26, 28 to storage system 12. Additionally/alternatively and when server computer/controller 100 is configured as an application server, these data requests may be internally generated within server computer/controller 100. Examples of data request 20 may include but are not limited to data write request 108 (i.e. a request that content 110 be written to storage system 12) and data read request 112 (i.e. a request that content 110 be read from storage system 12).

Server computer/controller 100 may include input-output logic 114 (e.g., a network interface card or a Host Bus Adaptor (HBA)), processing logic 116, and first cache system 118. Examples of first cache system 118 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 110 to be written to storage system 12 may be received by input-output logic 114 (e.g. from network 14 and/or network 18) and processed by processing logic 116. Additionally/alternatively and when server computer/controller 100 is configured as an application server, content 110 to be written to storage system 12 may be internally generated by server computer/controller 100. As will be discussed below in greater detail, processing logic 116 may initially store content 110 within first cache system 118.

Depending on the manner in which first cache system 118 is configured, processing logic 116 may immediately write content 110 to second cache system 120/data tiers 102, 104, 106 (if first cache system 118 is configured as a write-through cache) or may subsequently write content 110 to second cache system 120/data tiers 102, 104, 106 (if first cache system 118 is configured as a write-back cache). Examples of second cache system 120 (i.e., a backend cache system) may include but are not limited to a volatile, solid-state, cache memory system (e.g., a dynamic RAM cache memory system) and/or a non-volatile, solid-state, cache memory system (e.g., a flash-based, cache memory system).

The combination of second cache system 120 and data tiers 102, 104, 106 may form data array 122, wherein first cache system 118 may be sized so that the number of times that data array 122 is accessed may be reduced. Accordingly, by sizing first cache system 118 so that first cache system 118 retains a quantity of data sufficient to satisfy a significant quantity of data requests (e.g., data request 20), the overall performance of storage system 12 may be enhanced.

Further, second cache system 120 within data array 122 may be sized so that the number of times that data tiers 102, 104, 106 are accessed may be reduced. Accordingly, by sizing second cache system 120 so that second cache system 120 retains a quantity of data sufficient to satisfy a significant quantity of data requests (e.g., data request 20), the overall performance of storage system 12 may be enhanced.

As discussed above, the instruction sets and subroutines of data caching process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of data caching process 10 may be executed by one or more processors (not shown) and one or more memory architectures (not shown) included within data array 122.

The Data Caching Process

During operation of first cache system 118, data to be written to data array 122 and data read from data array 122 may be written to first cache system 118. For example, when content (e.g., content 110) is received by server computer/controller 100 for writing to data array 122 (in response to a write request), content 110 may also be written to first cache system 118. Further, when content is retrieved from data array 122 (in response to a read request), the retrieved content may also be written to first cache system 118. As first cache system 118 includes a finite amount of storage space, all content written to first cache system 118 may not be stored indefinitely.

For illustrative purposes, assume that first cache system 118 is configured to store sixty data chunks within sixty data slots included within first cache system 118. Examples of a data chunk may include but are not limited to a defined quantity of data, a portion of a file, or a complete data file.

Figure 3:
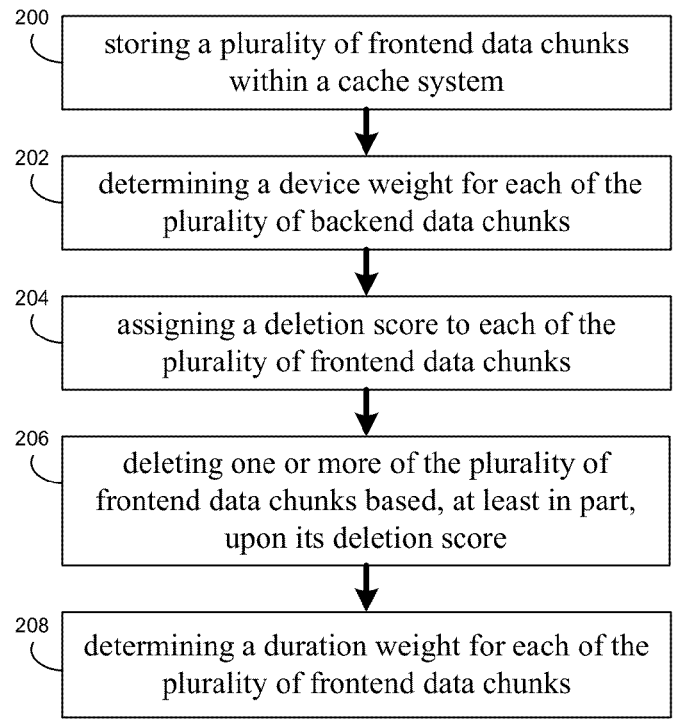
FIG. 3 is a flow chart of the data caching process of FIG. 1.

Referring also to FIG. 3, data caching process 10 may store 200 a plurality of frontend data chunks (e.g., frontend data chunks 124) within a cache system (e.g., first cache system 118). The cache system (e.g., first cache system 118) may be a frontend cache system included within a host (e.g., server computer/controller 100). The plurality of frontend data chunks (e.g., frontend data chunks 124) may correspond to a plurality of backend data chunks (e.g., backend data chunks 126) stored within a data array (e.g., data array 122).

As discussed above, data tiers 102, 104, 106 may be configured to provide various levels of performance, wherein one or more of data tiers 102, 104, 106 may be configured to be a lower performance data tier and one or more of data tiers 102, 104, 106 may be configured to be a higher performance data tier.

Accordingly, data tier 102 may be configured as a higher performance data tier and may include one or more flash storage devices. Data tier 104 may be configured as a medium performance data tier and may include one or more fiber channel storage devices. And data tier 106 may be configured as a lower performance data tier and may include one or more lower performance storage devices (e.g., SATA drives, SCSI drives, SAS drives, IDE drives, and EIDE drives).

Accordingly, a first portion (including highly used data; not shown) of backend data chunks 126 may be stored within data tier 102 (i.e., the higher performance data tier) of data array 122, a second portion (including moderately used data; not shown) of backend data chunks 126 may be stored within data tier 104 (i.e., the medium performance data tier) of data array 122, and a third portion (including lesser used data; not shown) of backend data chunks 126 may be stored within data tier 106 (i.e., the lower performance data tier) of data array 122.

Data caching process 10 may determine 202 a device weight (as shown in the table below) for each of the plurality of backend data chunks (e.g., backend data chunks 126). The device weight (as shown in the table below) may be indicative of the type of storage device (e.g., flash storage devices, fiber channel storage devices, SATA storage devices, SCSI storage devices, SAS drives storage devices, IDE storage devices, and EIDE storage devices) upon which each of the plurality of backend data chunks (e.g., backend data chunks 126) is stored within data array 122.

Assume for illustrative purposes that data caching process 10 needs to delete data chunks currently stored within first cache system 118 to make room for newly-received content (e.g., content 110) that needs to be stored within first cache system 118. As discussed above, first cache system 118 is configured (in this example) to store sixty data chunks within sixty data slots (all of which are full). Assume that data caching process 10 is reviewing the status of the last six slots within first cache system 118 for possible deletion to free up space for content 110. For this example, the sixty data chunks stored within first cache system 118 may be arranged in a least recently used fashion. Accordingly, the least recently used data chunk may be stored within the $60^{th}$ data slot of first cache system 118 and the most recently used data chunk may be stored within $1^{st}$ data slot of first cache system 118. The number of data chunks that would need to be deleted would vary depending upon the size of content 110.

Assume for this example that: the data chunks stored within the $56^{th}$ and $60^{th}$ slots of first cache system 118 are stored on SATA storage devices; the data chunks stored within the $55^{th}$ and $57^{th}$ slots of first cache system 118 are stored on flash storage devices; and the data chunks stored within the $58^{th}$ and $59^{th}$ slots of first cache system 118 are stored on fiber channel storage devices (as shown in the table below).

| $55^{th}$ | $56^{th}$ | $57^{th}$ | $58^{th}$ | $59^{th}$ | $60^{th}$ | (location with cache) |
|---|---|---|---|---|---|---|
| Flash | SATA | Flash | Fiber | Fiber | SATA | (device type) |
| 10 | 30 | 10 | 20 | 20 | 30 | (device weight) |
| 25 | 20 | 15 | 10 | 5 | 0 | (duration weight) |
| | | | | | | |
| 35 | 50 | 25 | 30 | 25 | 30 | (deletion score) |
| N | N | N | N | Y | N | (when deleting 1) |
| N | N | Y | N | Y | N | (when deleting 2) |
| N | N | Y | N | Y | Y | (when deleting 3) |
| N | N | Y | Y | Y | Y | (when deleting 4) |

As discussed above, data caching process 10 may determine 202 a device weight (as shown in the table above) for each of the plurality of backend data chunks (e.g., backend data chunks 126), wherein the device weight (as shown in the table above) may be indicative of the type of storage device upon which each of the plurality of backend data chunks is stored within data array 122. The type of storage device may classify storage devices based upon performance levels.

For this particular implementation, the higher a device weight, the more likely a data chunk will not be deleted. In this particular example, a backend data chunk stored on a flash storage devices (i.e., the higher performance storage devices) may be assigned a device weight of 10, a backend data chunk stored on a fiber channel storage devices (i.e., the medium performance storage devices) may be assigned a device weight of 20, and a backend data chunk stored on a SATA storage devices (i.e., the lower performance storage devices) may be assigned a device weight of 30.

Accordingly, when a data chunk is stored on a slower storage device, it is less likely that the data chunk will be deleted from first cache system 118, as it would be more expensive (with respect to disk and/or data fetch response time) to re-obtain it from data array 122 in the event that it is needed again. Conversely, when a data chunk is stored on a faster storage device, it is more likely that the data chunk will be deleted from first cache system 118), as it would be less expensive (with respect to disk and/or data fetch response time) to re-obtain it from data array 122 in the event that it is needed again.

Data caching process 10 may assign 204 a deletion score (as shown in the table above) to each of the plurality of frontend data chunks (e.g., frontend data chunks 124). Each deletion score (as shown in the table above) may be based, at least in part, upon the device weight (as shown in the table above) determined 202 for its corresponding backend data chunk (e.g., backend data chunks 126). Data caching process 10 may delete 206 one or more of the plurality of frontend data chunks (e.g., frontend data chunks 124) based, at least in part, upon its deletion score (as shown in the table above).

As discussed above, the sixty data chunks stored within first cache system 118 may be arranged in a least recently used fashion, wherein the least recently used data chunk may be stored within the $60^{th}$ data slot of first cache system 118 and the most recently used data chunk may be stored within $1^{st}$ data slot of first cache system 118. Accordingly, the data chunk stored within the $60^{th}$ data slot of first cache system 118 (comparatively) has not been used in a considerable amount of time. Conversely, the data chunk stored within the $1^{st}$ data slot of first cache system 118 (comparatively) has been used recently. Therefore, the closer a data chunk is positioned to the $1^{st}$ data slot within first cache system 118, the more likely it is that this data chunk will be used in the immediate future. And conversely, the closer a data chunk is positioned to the $60^{th}$ data slot within first cache system 118, the less likely it is that this data chunk will be used in the immediate future.

Accordingly, data caching process 10 may determine 208 a duration weight (as shown in the table above) for each of the plurality of frontend data chunks (e.g., frontend data chunks 124). This duration weight (as shown in the table above) may be indicative of the amount of time since each of the plurality of frontend data chunks (e.g., frontend data chunks 124) has been accessed within first cache system 118. As discussed above and for this particular implementation, the higher a duration weight, the more likely a data chunk will not be deleted. Accordingly, the data chunk positioned within the $60^{th}$ data slot within first cache system 118 may have the lowest duration weight (as it is the most likely to be deleted). And since (in this example), we are examining the data chunks stored within the $55^{th}$-the $60^{th}$ data slots, the data chunk positioned within the $55^{th}$ data slot within first cache system 118 may have the highest duration weight (as it is the least likely to be deleted).

As discussed above, data caching process 10 may assign 204 a deletion score (as shown in the table above) to each of the plurality of frontend data chunks (e.g., frontend data chunks 124), wherein each deletion score (as shown in the table above) may be based, at least in part, upon the device weight (as shown in the table above) determined 202 for its corresponding backend data chunk (e.g., backend data chunks 126). Each deletion score (as shown in the table above) may be further based, at least in part, upon the duration weight (as shown in the table above) determined 208 for each of the plurality of frontend data chunks (e.g., frontend data chunks 124). As discussed above, data caching process 10 may delete 206 one or more of the plurality of frontend data chunks (e.g., frontend data chunks 124) based, at least in part, upon its deletion score (as shown in the table above).

Referring to the table above and in this example, the following may be determined:

$60^{th}$ Data Slot: The frontend data chunk stored within the $60^{th}$ data slot of frontend cache system 118 is assigned a duration weight of 0 (i.e., the lowest duration weight of the group), indicating that this frontend data chunk has been stored within frontend cache system 118 for the longest period of time without being accessed. Further, the frontend data chunk stored within the 60$^{th}$ data slot of frontend cache system 118 is assigned a device weight of 30 (for a SATA storage device), as it would be more expensive (with respect to response time) to re-obtain this frontend data chunk from data array 122 in the event that it is needed again. Accordingly, the frontend data chunk stored within the 60$^{th}$ data slot of frontend cache system 118 is assigned a deletion score of 30 (i.e., the sum of the assigned duration weight of 0 and the assigned device weight of 30).

59$^{th}$ Data Slot: The frontend data chunk stored within the 59$^{th}$ data slot of frontend cache system 118 is assigned a duration weight of 5 (i.e., the 2$^{nd}$ lowest duration weight of the group), indicating that this frontend data chunk has been stored within frontend cache system 118 for the 2$^{nd}$ longest period of time without being accessed. Further, the frontend data chunk stored within the 59$^{th}$ data slot of frontend cache system 118 is assigned a device weight of 20 (for a fiber channel storage device), as it would be moderately expensive (with respect to response time) to re-obtain this frontend data chunk from data array 122 in the event that it is needed again. Accordingly, the frontend data chunk stored within the 59$^{th}$ data slot of frontend cache system 118 is assigned a deletion score of 25 (i.e., the sum of the assigned duration weight of 5 and the assigned device weight of 20).

58$^{th}$ Data Slot: The frontend data chunk stored within the 58$^{th}$ data slot of frontend cache system 118 is assigned a duration weight of 10 (i.e., the 3$^{rd}$ lowest duration weight of the group), indicating that this frontend data chunk has been stored within frontend cache system 118 for the 3$^{rd}$ longest period of time without being accessed. Further, the frontend data chunk stored within the 58$^{th}$ data slot of frontend cache system 118 is assigned a device weight of 20 (for a fiber channel storage device), as it would be moderately expensive (with respect to response time) to re-obtain this frontend data chunk from data array 122 in the event that it is needed again. Accordingly, the frontend data chunk stored within the 58$^{th}$ data slot of frontend cache system 118 is assigned a deletion score of 30 (i.e., the sum of the assigned duration weight of 10 and the assigned device weight of 20).

57$^{th}$ Data Slot: The frontend data chunk stored within the 57$^{th}$ data slot of frontend cache system 118 is assigned a duration weight of 15 (i.e., the 4$^{th}$ lowest duration weight of the group), indicating that this frontend data chunk has been stored within frontend cache system 118 for the 4$^{th}$ longest period of time without being accessed. Further, the frontend data chunk stored within the 57$^{th}$ data slot of frontend cache system 118 is assigned a device weight of 10 (for a flash storage device), as it would be less expensive (with respect to response time) to re-obtain this frontend data chunk from data array 122 in the event that it is needed again. Accordingly, the frontend data chunk stored within the 57$^{th}$ data slot of frontend cache system 118 is assigned a deletion score of 25 (i.e., the sum of the assigned duration weight of 15 and the assigned device weight of 10).

56$^{th}$ Data Slot: The frontend data chunk stored within the 56$^{th}$ data slot of frontend cache system 118 is assigned a duration weight of 20 (i.e., the 5$^{th}$ lowest duration weight of the group), indicating that this frontend data chunk has been stored within frontend cache system 118 for the 5$^{th}$ longest period of time without being accessed. Further, the frontend data chunk stored within the 56$^{th}$ data slot of frontend cache system 118 is assigned a device weight of 30 (for a SATA storage device), as it would be more expensive (with respect to response time) to re-obtain this frontend data chunk from data array 122 in the event that it is needed again. Accordingly, the frontend data chunk stored within the 56$^{th}$ data slot of frontend cache system 118 is assigned a deletion score of 50 (i.e., the sum of the assigned duration weight of 20 and the assigned device weight of 30).

55$^{th}$ Data Slot: The frontend data chunk stored within the 55$^{th}$ data slot of frontend cache system 118 is assigned a duration weight of 25 (i.e., the 6$^{th}$ lowest duration weight of the group), indicating that this frontend data chunk has been stored within frontend cache system 118 for the 6$^{th}$ longest period of time without being accessed. Further, the frontend data chunk stored within the 55$^{th}$ data slot of frontend cache system 118 is assigned a device weight of 10 (for a flash storage device), as it would be less expensive (with respect to response time) to re-obtain this frontend data chunk from data array 122 in the event that it is needed again. Accordingly, the frontend data chunk stored within the 55$^{th}$ data slot of frontend cache system 118 is assigned a deletion score of 35 (i.e., the sum of the assigned duration weight of 25 and the assigned device weight of 10).

As discussed above, data caching process 10 may delete 206 one or more of the plurality of frontend data chunks (e.g., frontend data chunks 124) based, at least in part, upon its deletion score (as shown in the table above). For the following discussion, assume that when two deletion scores are identical, the frontend data chunk more closely positioned to (in this example) the 60$^{th}$ data slot may be deleted.

Accordingly, if one frontend data chunk needs to be deleted, data caching process 10 may delete 206 the frontend data chunk stored within the 59$^{th}$ data slot of frontend cache system 118, which has a deletion score of 25. Data caching process 10 may delete 206 the frontend data chunk stored within the 59$^{th}$ data slot of frontend cache system 118 prior to deleting the frontend data chunk stored within the 57$^{th}$ data slot (which also has a deletion score of 25) due to the frontend data chunk stored within the 59$^{th}$ data slot having a lower assigned duration weight (i.e., since it is more closely positioned to the 60$^{th}$ data slot).

If two frontend data chunks need to be deleted, data caching process 10 may delete 206 the frontend data chunks stored within the 57$^{th}$ and 59$^{th}$ data slots of frontend cache system 118, which have deletion scores of 25.

Further, if three frontend data chunks need to be deleted, data caching process 10 may delete 206 the frontend data chunks stored within the 57$^{th}$, 59$^{th}$ and 60$^{th}$ data slots of frontend cache system 118, which have deletion scores of 25, 25 and 30 (respectively). Data caching process 10 may delete 206 the frontend data chunk stored within the 60$^{th}$ data slot of frontend cache system 118 prior to deleting the frontend data chunk stored within the 58$^{th}$ data slot (which also has a deletion score of 30) due to the frontend data chunk stored within the 60$^{th}$ data slot having the lowest assigned duration weight (i.e., since it is the 60$^{th}$ data slot).

Further, if four frontend data chunks need to be deleted, data caching process 10 may delete 206 the frontend data chunks stored within the 57$^{th}$, 58$^{th}$, 59$^{th}$ and 60$^{th}$ data slots of frontend cache system 118, which have deletion scores of 25, 30, 25 and 30 (respectively).

While in the above-stated example, two factors are discussed as being considered by data caching process 10 when determining how to free up storage space within frontend cache system 118 (resulting in the calculation of a device weight and a duration weight), this is for illustrative purposes only and is not intended to be a limitation of this disclosure, as other configurations are possible and are considered to be within the scope of this disclosure and claims. Specifically, additional factors may be considered by data caching process 10.

For example, data caching process 10 may consider the current load of a particular disk drive/storage device. For example, assume that data array 122 includes two equivalent devices (e.g., two fiber channel storage devices), wherein one of the fiber channel storage devices is highly loaded and the other fiber channel storage device is not loaded at all. If the data slots within frontend cache system 118 that are associated with both devices are being considered for being overwritten with new content (e.g., content 110), data caching process 10 may give preference to preserving the data slots (within frontend cache system 118) that are associated with the highly-loaded device.

Additionally/alternatively, data caching process 10 may consider the overall load of a data array. For example, assume that server computer/controller 100 is coupled to a second data array (not shown). Further, assume that data array 122 includes a first fiber channel storage device and the other data array (not shown) includes a second fiber channel storage device (not shown), wherein both fiber channel storage devices are equally loaded. However, assume that the overall load of data array 122 is higher than the overall load of the other data array (not shown). If the data slots within frontend cache system 118 that are associated with both devices are being considered for being overwritten with new content (e.g., content 110), data caching process 10 may give preference to preserving the data slots (within frontend cache system 118) that are associated with the highly loaded data array (namely data array 122).

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    storing a plurality of frontend data chunks within a cache system, wherein the plurality of frontend data chunks correspond to a plurality of backend data chunks stored within a data array;
    determining a device weight for each of the plurality of backend data chunks, wherein the device weight is indicative of the type of storage device upon which each of the plurality of backend data chunks is stored within the data array;
    assigning a deletion score to each of the plurality of frontend data chunks, wherein each deletion score is based, at least in part, upon the device weight determined for its corresponding backend data chunk and a current load associated with an associated storage device; and
    determining a duration weight for each of the plurality of frontend data chunks, wherein the duration weight is indicative of the amount of time since each of the plurality of frontend data chunks has been accessed within the cache system, wherein each deletion score is further based, at least in part, upon the duration weight determined for each of the plurality of frontend data chunks.

2. The computer implemented method of claim 1 further comprising:
    deleting one or more of the plurality of frontend data chunks based, at least in part, upon its deletion score.

3. The computer implemented method of claim 1 wherein the cache system is a frontend cache system included within a host.

4. The computer implemented method of claim 1 wherein the storage device type classifies storage devices based upon performance levels.

5. The computer implemented method of claim 1 wherein the storage device type includes one or more of a SATA storage device type, a fiber channel storage device type, and a flash storage device type.

6. A computer program product residing on a non-transitory computer readable medium having a plurality of instructions stored thereon which, when executed by a processor, cause the processor to perform operations comprising:
    storing a plurality of frontend data chunks within a cache system, wherein the plurality of frontend data chunks correspond to a plurality of backend data chunks stored within a data array;
    determining a device weight for each of the plurality of backend data chunks, wherein the device weight is indicative of the type of storage device upon which each of the plurality of backend data chunks is stored within the data array;
    assigning a deletion score to each of the plurality of frontend data chunks, wherein each deletion score is based, at least in part, upon the device weight determined for its corresponding backend data chunk and a current load associated with an associated storage device; and
    determining a duration weight for each of the plurality of frontend data chunks, wherein the duration weight is indicative of the amount of time since each of the plurality of frontend data chunks has been accessed within the cache system, wherein each deletion score is further based, at least in part, upon the duration weight determined for each of the plurality of frontend data chunks.

7. The computer program product of claim 6 further comprising instructions for:
    deleting one or more of the plurality of frontend data chunks based, at least in part, upon its deletion score.

8. The computer program product of claim 6 wherein the cache system is a frontend cache system included within a host.

9. The computer program product of claim 6 wherein the storage device type classifies storage devices based upon performance levels.

10. The computer program product of claim 6 wherein the storage device type includes one or more of a SATA storage device type, a fiber channel storage device type, and a flash storage device type.

11. A computing system including at least one processor and at least one memory architecture coupled with the at least one processor, wherein the computing system is configured to perform operations comprising:
    storing a plurality of frontend data chunks within a cache system, wherein the plurality of frontend data chunks correspond to a plurality of backend data chunks stored within a data array;
    determining a device weight for each of the plurality of backend data chunks, wherein the device weight is indicative of the type of storage device upon which each of the plurality of backend data chunks is stored within the data array;
    assigning a deletion score to each of the plurality of frontend data chunks, wherein each deletion score is based, at least in part, upon the device weight determined for its corresponding backend data chunk and a current load associated with an associated storage device; and determining a duration weight for each of the plurality of frontend data chunks, wherein the duration weight is indicative of the amount of time since each of the plurality of frontend data chunks has been accessed within the cache system, wherein each deletion score is further based, at least in part, upon the duration weight determined for each of the plurality of frontend data chunks.

12. The computing system of claim 11 further configured to perform operations comprising:
deleting one or more of the plurality of frontend data chunks based, at least in part, upon its deletion score.

13. The computing system of claim 11 wherein the cache system is a frontend cache system included within a host.

14. The computing system of claim 11 wherein the storage device type classifies storage devices based upon performance levels.

15. The computing system of claim 11 wherein the storage device type includes one or more of a SATA storage device type, a fiber channel storage device type, and a flash storage device type.

* * * * *